(12) United States Patent
Revelle et al.

(10) Patent No.: US 10,657,537 B2
(45) Date of Patent: May 19, 2020

(54) SYSTEMS AND METHODS FOR ASYNCHRONOUS PROCESSING OF EVENTS WITHIN NETWORKS

(71) Applicant: MASTERCARD INTERNATIONAL INCORPORATED, Purchase, NY (US)

(72) Inventors: Jason Revelle, Chesterfield, MO (US); Jeff Hammontree, Center, MO (US); Richard M. Navarro, St. Charles, MO (US); Robert C. Schupp, Washington, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 612 days.

(21) Appl. No.: 14/930,286

(22) Filed: Nov. 2, 2015

(65) Prior Publication Data
US 2017/0124569 A1    May 4, 2017

(51) Int. Cl.
*G06Q 20/42* (2012.01)
*G06Q 20/40* (2012.01)
(Continued)

(52) U.S. Cl.
CPC ............ *G06Q 20/42* (2013.01); *G06F 9/542* (2013.01); *G06Q 20/227* (2013.01); *G06Q 20/401* (2013.01); *G06Q 20/405* (2013.01)

(58) Field of Classification Search
CPC .. G06Q 20/542; G06Q 20/123; G06Q 20/401; G06Q 20/405
See application file for complete search history.

(56) References Cited

U.S. PATENT DOCUMENTS

| 8,380,489 B1 * | 2/2013 | Zhang | G06F 17/2785 |
| | | | 704/4 |
| 2008/0034088 A1 * | 2/2008 | Suresh | H04L 51/38 |
| | | | 709/224 |

(Continued)

FOREIGN PATENT DOCUMENTS

WO    WO-2005083935 A1 *    9/2005    ............. H04L 67/04

OTHER PUBLICATIONS

Cugola et al. "Exploiting and Event-Based Infrastructure to Develop Complex Distributed Systems." Proceedings of the 20th International Conference on Software Engineering, pp. 261-270 (Jan. 1, 1998). (Year: 1998).*

*Primary Examiner* — Virpi H Kanervo
(74) *Attorney, Agent, or Firm* — Harness, Dickey & Pierce, P.L.C.

(57) ABSTRACT

Systems and methods are provided for use in asynchronous processing of events within a network. One exemplary method includes receiving multiple events for asynchronous processing, each defined by at least one rule, and assigning, by a computing device, the multiple events to an event queue. The method also includes retrieving, by the computing device, a first one of the multiple events from the event queue; transforming, by the computing device, the first one of the multiple events into a first event object; and recording, by the computing device, the first event object to a data structure. The method further includes identifying, by the computing device, at least one notification message associated with the first event object and causing, by the computing device, the at least one notification message, associated with the first event object, to be delivered.

14 Claims, 5 Drawing Sheets

(51) Int. Cl.
*G06Q 20/22* (2012.01)
*G06F 9/54* (2006.01)

(56) References Cited

U.S. PATENT DOCUMENTS

| | | | | |
|---|---|---|---|---|
| 2012/0303968 A1* | 11/2012 | Balinsky | H04L 9/14 | 713/189 |
| 2013/0006841 A1* | 1/2013 | Singer | G06Q 30/02 | 705/37 |
| 2013/0311356 A1* | 11/2013 | Ho | G06Q 20/123 | 705/39 |

* cited by examiner

SYSTEMS AND METHODS FOR ASYNCHRONOUS PROCESSING OF EVENTS WITHIN NETWORKS

FIELD

The present disclosure generally relates to systems and methods for use in asynchronous processing of events within networks, and in particular, asynchronous processing of notification events.

BACKGROUND

This section provides background information related to the present disclosure which is not necessarily prior art.

Processing data traffic and tasks within networks is often time sensitive to ensure quality of service to the users of the networks, whether machine users or human users. In the context of payment networks, speed of handling authorization requests is the subject of various network processes, so that consumers are able to transact for goods and services, funded by payment accounts, promptly after providing payment credentials to merchants. In addition to the authorization of transactions to payment accounts, payment networks are known to provide additional services, in conjunction with authorization processing, such as, for example, fraud protection services. As the number of services in-line with the transactional authorization is increased, performance, and in particular, speed, of responding to authorization requests is increasingly important.

DRAWINGS

The drawings described herein are for illustrative purposes only of selected embodiments and not all possible implementations, and are not intended to limit the scope of the present disclosure.

Figure 1:
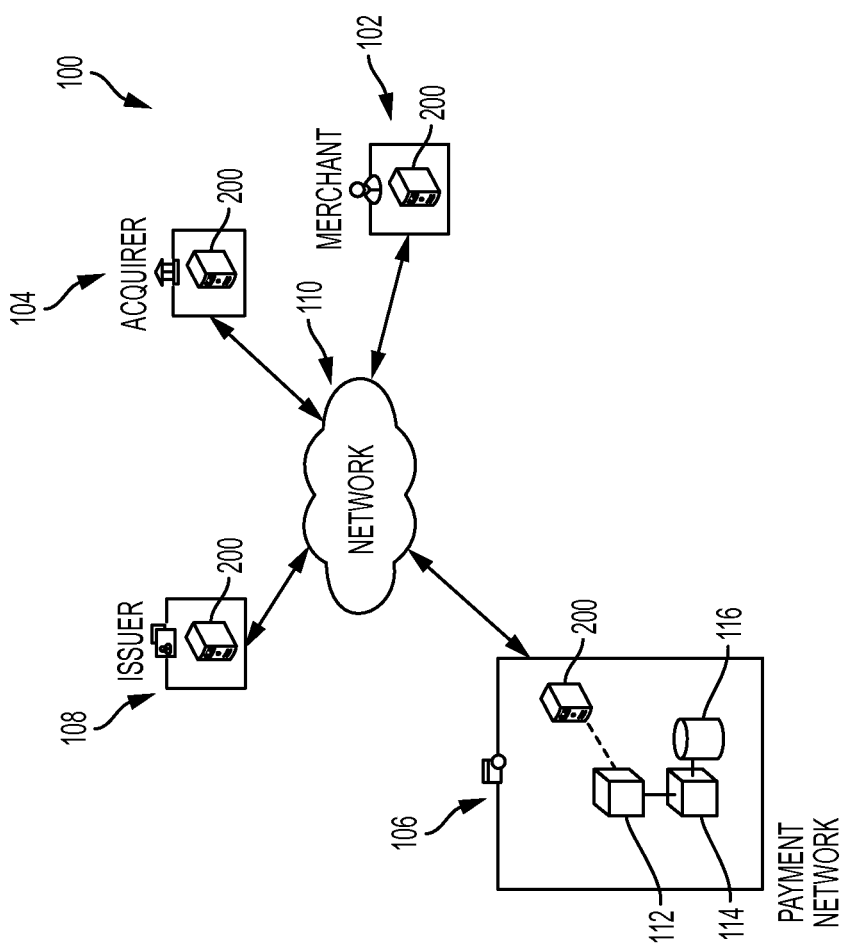
FIG. 1 is a block diagram of an exemplary system of the present disclosure suitable for use in processing events pertaining to payment accounts and executing tasks based on the events.
Figure 4:
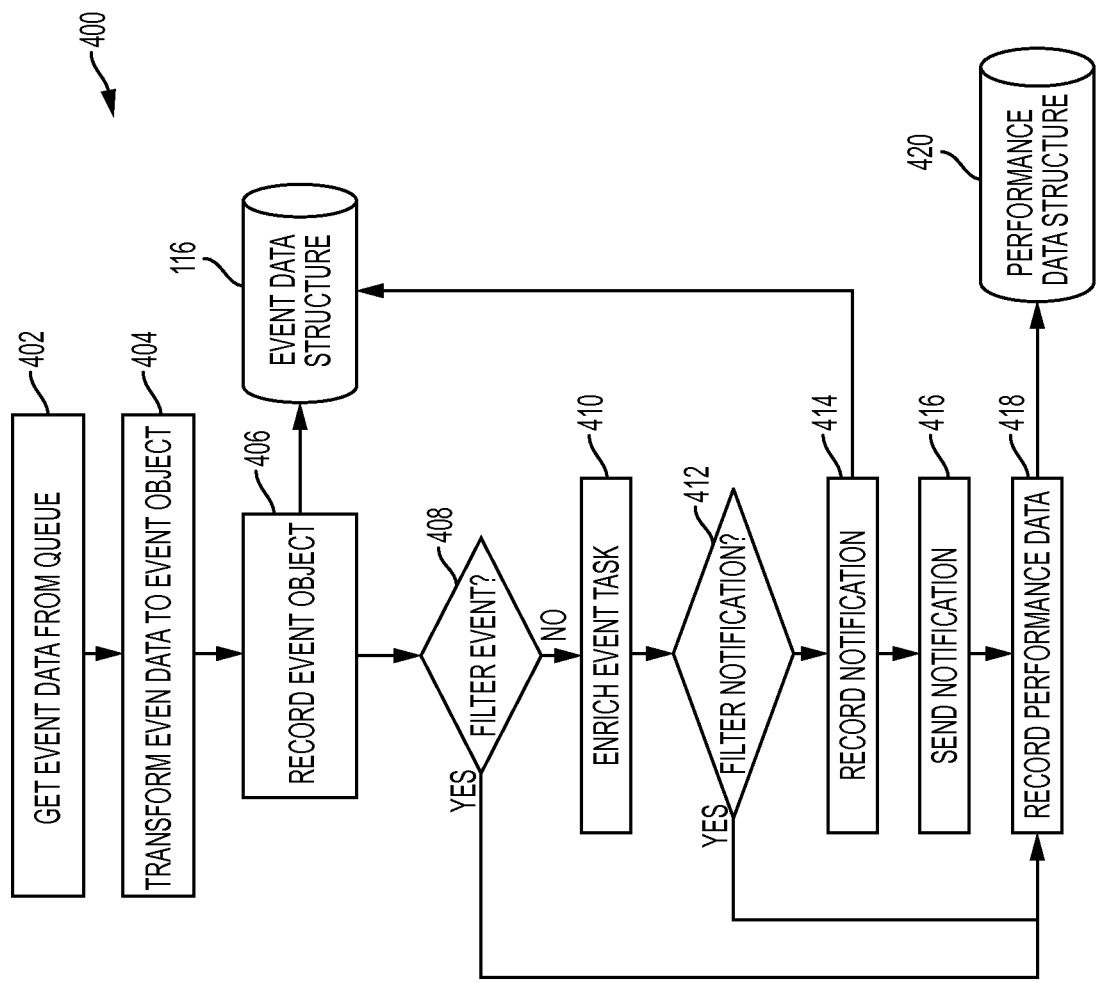
Figure 5:
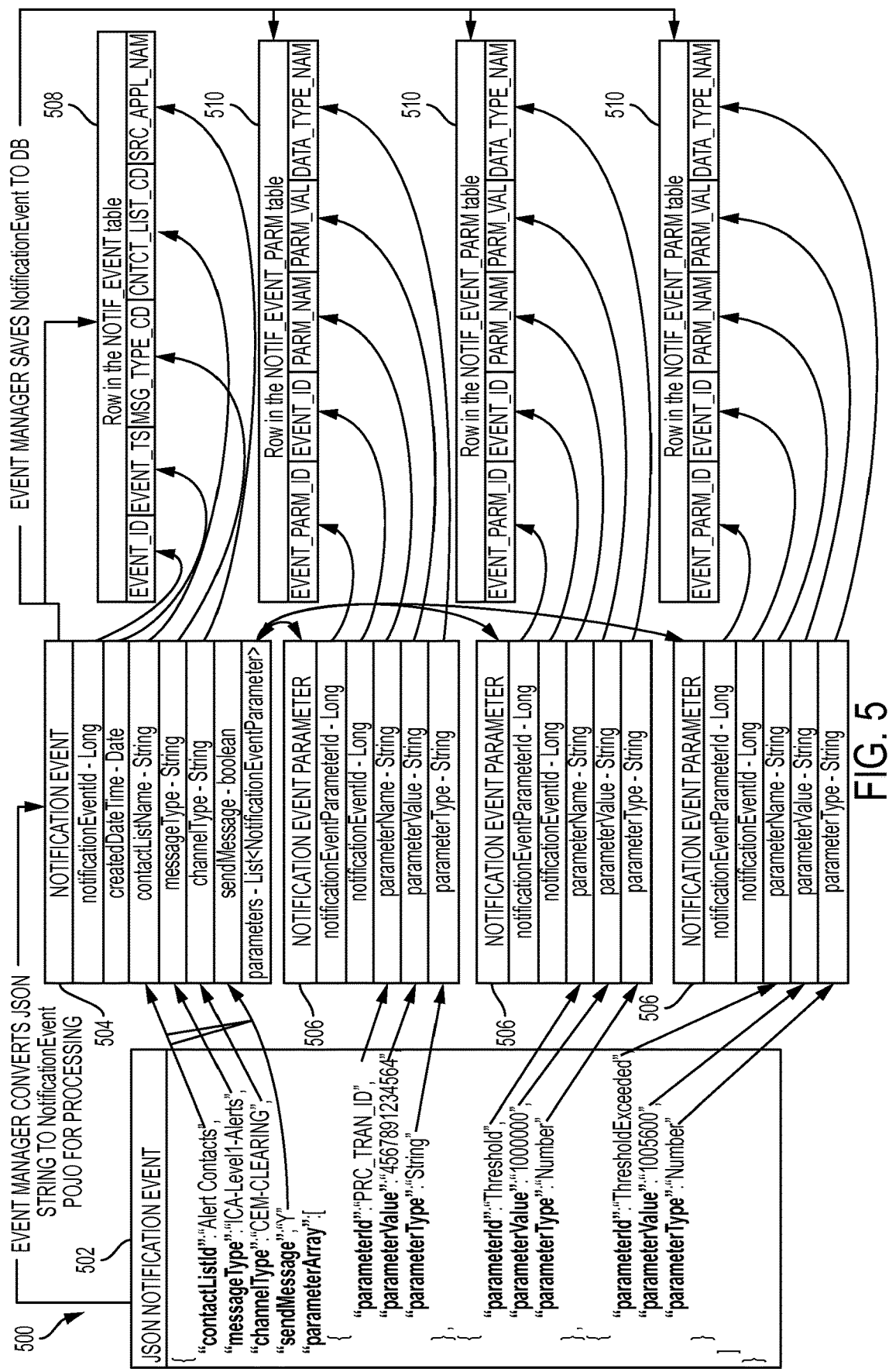

FIG. 4 is an exemplary method for processing events pertaining to payment accounts, suitable for use in the system of FIG. 1; and FIG. 5 is an exemplary flow illustrating transformation of a JavaScript Object Notation (JSON) formatted event into an event object and further into a relational database format, that may be implemented in connection with the system of FIG. 1 and/or the method of FIG. 4.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Funding transactions for products, i.e., goods and services, through payment accounts has become ubiquitous. Multiple events are typically associated with the transactions to the payment accounts in a given payment network. The events may be related to authorization, settlement, and/or clearing of the transactions. Generally, the events, which pass through the payment network, are processed synchronously along a path, from their points of origin (e.g., an acquirer) to their points of destination (e.g., an issuer). However, certain events may be processed asynchronously, apart from the network activity maintained in the path between different points of the network. The systems and methods herein uniquely enable the asynchronous processing of such certain events in order to enable timely execution of time-critical tasks associated with the events while also executing less urgent notification tasks for the events without interfering with the execution of the time-critical tasks.

FIG. 1 illustrates an exemplary system 100, in which the one or more aspects of the present disclosure may be implemented. Although the system 100 is presented in one arrangement, other embodiments may include the parts of the system 100 (or other parts) arranged otherwise depending on, for example, services provided within a network, etc.

The system 100 generally includes a merchant 102, an acquirer 104, a payment network 106, and an issuer 108, each coupled to (and in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which may provide interconnection between one or more of the merchant 102, the payment network 106, and a consumer, etc.

The merchant 102 is generally associated with products (e.g., goods and/or services, etc.), which are offered for sale and are sold to consumers (not shown). The merchant 102 may offer the products for sale in physical locations or through websites, or through other web-based store fronts, as desired.

In some embodiments, a consumer is able to fund transactions with the merchant 102 for one or more products, via a payment account. Use of the payment account to fund a transaction by the consumer may be authenticated by providing the correct information to the merchant 102 (e.g., account number, expiration date, account holder name, etc.). The account information may be manually provided by the consumer or it may be provided through other means, such as by swiping a credit card through a magnetic card reader.

In any case, in connection with a payment account transaction by the consumer at the merchant 102, for the purchase of a product, the transaction is generally initiated by presentation of a payment device (associated with the corresponding payment account) by the consumer to the merchant 102. In turn, the merchant 102 submits an authorization request to the acquirer 104 for the transaction. The authorization request may include, for example, a payment account number (PAN), an amount of the transaction, a merchant ID, a merchant category code (MCC), and/or additional information as desired and/or as necessary to process the transaction, etc. (broadly, transaction data). The acquirer 104 then communicates the authorization request to the issuer 108, through the payment network 106, such as, for example, through MasterCard®, VISA®, Discover®, American Express®, etc., to determine (by the issuer 108) whether the payment account (associated with the payment device) is in good standing and whether there is sufficient credit and/or funds to complete the transaction. If the issuer 108 accepts the transaction, a reply authorizing the transaction is provided back to the acquirer 104 and the merchant 102, thereby permitting the merchant 102 to complete the transaction. The transaction is later cleared and/or settled by and between the merchant 102 and the acquirer 104 (via an agreement between the merchant 102 and the acquirer 104), and by and between the acquirer 104 and the issuer 108 (via an agreement between the acquirer 104 and the issuer 108) (through further communications therebetween). If the issuer 108 declines the transaction, however, a reply declining the transaction is provided back to the merchant 102, thereby permitting the merchant 102 to terminate the transaction.

Transaction data is generated, collected, and stored as part of the above interactions among the merchant 102, the acquirer 104, the payment network 106, the issuer 108, and the consumer. The transaction data represents at least a plurality of transactions, for example, authorized transactions, cleared and/or settled transactions, attempted transactions, etc. The transaction data, in this exemplary embodiment, is stored at least by the payment network 106 (e.g., in a data structure associated with the payment network 106, etc.). Additionally, or alternatively, the merchant 102, the acquirer 104 and/or the issuer 108 may store the transaction data, or part thereof, in a data structure, or transaction data may be transmitted between parts of system 100 as used or needed. As indicated above, the transaction data may include, for example, payment account numbers, amounts of the transactions, merchant IDs, merchant category codes (MCCs), dates/times of the transactions, products purchased and related descriptions or identifiers, etc.

In various exemplary embodiments, consumers involved in the different transactions herein are prompted to agree to legal terms associated with their payment accounts, for example, during enrollment in their accounts, etc. In so doing, the consumers may voluntarily agree, for example, to allow merchants, issuers, payment networks, etc., to use data collected during enrollment and/or collected in connection with processing the transactions, subsequently for one or more of the different purposes described herein.

As part of authorizing the various transactions and and/or as part of other network activity associated with the payment network 106 (e.g., settlement and clearing of transactions, etc.), events are generated in the system 100, and in particular, at the payment network 106. The events may be processed synchronously or asynchronously, depending on, for example, one or more various business rules, which may be indicative of quality of service, event priorities, event scoring, etc.

In connection therewith, the payment network 106 of the illustrated system 100 includes an event coordinator 112, an event manager 114, and an event data structure 116.

The event coordinator 112 is specifically configured, by computer-executable instructions, to employ various rules to determine whether certain events generated in the system 100 may be processed asynchronously, or out of line with or apart from the payment network activity causing the event. The rules employed by the event coordinator 112 may relate to, without limitation, total numbers of transactions in a time interval, domestic versus cross border transactions, particular types of transactions (e.g., card-not-present transactions, internet transactions, etc.), etc.

The event manager 114 is specifically configured, by computer-executable instructions, to process asynchronous events received from the event coordinator 112 and, when necessary or desired, to cause notification messages to be delivered to one or more user, internal and/or external to the payment network 106. The event manager 114 additionally coordinates with the event data structure 116 to store event objects (and other data associated with the received events) as defined and/or composed by the event manager 114.

Figure 2:
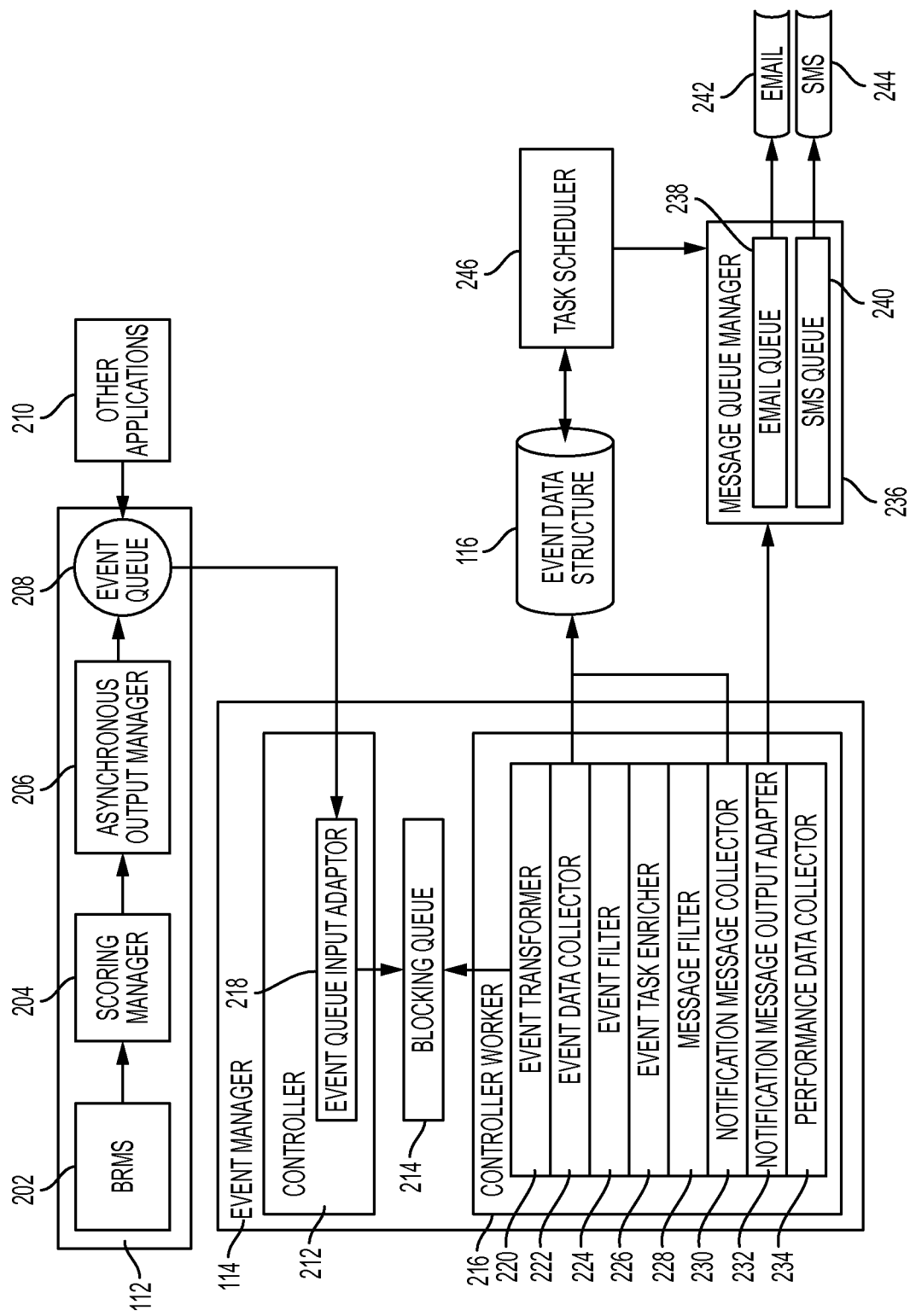
FIG. 2 is a block diagram illustrating aspects of an exemplary event coordinator, event manager, and event data structure, as included in the system of FIG. 1, and the interactions therebetween.

Further details regarding the event coordinator 112 and event manager 114 of the system 100 are illustrated in FIG. 2. It should be appreciated that while multiple components are illustrated for each of the event coordinator 112 and the event manager 114, various ones of the components may be integrated in certain embodiments, or otherwise segregated based on, for example, operations provided thereby, etc., in other embodiments.

As shown in FIG. 2, the event coordinator 112 includes a business rule manger system (BRMS) 202, a scoring manger 204, an asynchronous output manger (AOM) 206, and an event queue 208. The BRMS 202 includes multiple rules (e.g., stored in memory, etc.), which are employed by the scoring manager 204 to, for example, receive transactions, via the network 110, enrich the transactions with relevant data, and then pass the transactions with the enriched data to the BRMS 202 to be subjected to a series of business rules and further data enrichment. In general, when the transactions return to the scoring manager 204 from the BRMS 202, the scoring manager 204 is configured to respond, via the network 110, and send copies of the transactions to the AOM 206 for persistence and notification event handling (as described below). The AOM 206 may include a filter, which is configured to determine when transactions contain any events bound for the event manager 114 (e.g., notifications for asynchronous processing, etc.), and when found, to send those events to the event manager 114. The scoring manager 204 then returns to get another transaction, via the network 110.

When the scoring manger 204 indicates an event, based on one of the received transactions, is suitable for asynchronous processing, the AOM 206 is configured to store the event in the event queue 208 and/or to write the transaction to the event manager 114 (e.g., to avoid slowdown of event processing from the scoring manager 204, or otherwise, in the payment network 106, etc.). Apart from the AOM 206, events suitable for asynchronous processing may also originate from other applications 210 within the payment network 106. For example, asynchronous events may be received from other development teams developing programs that need notification services without having to develop them, business rule execution servers, object grid servers, or other front end applications, etc. Regardless of source, the event queue 208 maintains a list of all events stored therein, either from the AOM 206 or from the other applications 210. The event queue 208 may maintain the events on the list in the order in which the events are recorded to the queue 208 or, alternatively, the event queue 208 may enforce a different priority order for the events recorded therein. In the system 100, the event queue 208 accepts event data in a JavaScript Object Notation (JSON) format. However, in other embodiments other formats may be used (e.g., XML, Serialized Flextp Message Java Object, CIS0100, CIS0120, JLog, ASCII0120, etc.).

The event manager 114 includes a controller 212, a blocking queue 214, and a controller worker 216 for processing the events retrieved from the event queue 208.

As shown, the controller 212 of the event manager 114 includes an event queue input adaptor 218, which polls the event queue 208 for new event data. Each event returned in response to the polling is added to the blocking queue 214, which holds the event data until the controller worker 216 is available and able to obtain and/or receive the event data from of the blocking queue 214 (e.g., throttles event delivery to the controller 212, etc.). The controller 212 then feeds event data to the controller worker 216. While only one controller worker 216 is included in FIG. 2, for purposed of illustration, it should be appreciated that multiple controller workers 216 may be coupled to the controller 212. In such cases, the blocking queue 214 holds the event data unit the next controller worker is available and able to obtain the event data off the blocking queue 214. The controller 212 then feeds event data to the multiple controller workers, which process the events in parallel. Each of the multiple controller workers accesses the blocking queue 214 and retrieves the next event in the queue, which removes the event from the queue. Specifically, in certain embodiments, the controller 212 creates and runs additional controller workers as necessary to keep up with the rate of events, and the controller 212 may end extraneous controller workers 216 once they are no longer needed.

The controller worker 216 of the event manager 114 includes multiple components, or modules, for use in processing an event and executing tasks associated with the event. For example, the controller worker 216 illustrated in FIG. 2 includes an event transformer 220, an event data collector 222, an event filter 224, an event task enricher 226, a message filter 228, a notification message collector 230, a notification message output adapter 232, and a performance data collector 234.

The event transformer 220 of the controller worker 216 is configured to parse and/or transform the event data received from the event queue 208 into an event object (e.g., an in-memory value object, etc.) to enable the controller worker 216 to further process the event data. The event data may be in a format such as JSON, which is essentially a string of characters. The event transformer 220 may then parse JSON strings (as well as other formats) into a software event object which is more easily accessible to other modules of the controller worker 216. The event data collector 222 is configured to record the transformed event object, from the event transformer 220, to the event data structure 116. The event object may be recorded in its current form, or the data of the event object may be recorded according to a different storage scheme, such as a relational database.

For some events, the event filter 224 of the controller worker 216 is configured to prevent and/or suppress events from being acted upon, processed, and/or executed, by the controller worker 216, based on one or multiple reasons defined in filtering rules. For instance, if an event requires that an alert message be generated and sent to a consumer (broadly, a user) informing that his/her payment account is suspended for a period of time due to likely fraudulent activity, additional events of a similar nature, requiring similar alert messages, received within the suspension period may be suppressed and/or filtered out, as the task of sending the alert message has already been completed. As such, the event filter 224 may act to prevent multiple redundant messages being sent to the consumer. If the event is filtered, the controller worker 216 may then skip the remaining processing and/or may record performance data using performance data collector 234. Apart from events causing one or more notifications, the event filter 224 may further filter non-message or non-notification events, for example, "heartbeat" events (i.e., indicating a device or connection is "alive" or active). Such events may be filtered, at the event filter 224, and recorded in the event data structure 116 for later analysis, summarization, or other processing.

The event task enricher 226 of the controller worker 216 is configured to determine, based on aspects of the event being processed, such as an event type, which tasks must be executed in relation to the event. Further, the event task enricher 226 is configured to execute those tasks. In some embodiments, the event task enricher 226 accesses a list of tasks (e.g., stored in memory, etc.) and determines the tasks that are required based on the aspects of the event. If the tasks being executed are associated with messages to be composed and/or sent (e.g., messages to consumers regarding payment accounts, messages to internal employees regarding detected errors, messages regarding fraudulent activity, etc.), for example, the event task enricher 226 may compose the associated messages using the tasks being executed and specific event information. The event task enricher 226 may only obtain and execute tasks which require immediate execution based on the event, or the event task enricher 226 may execute any tasks configured to be immediately executed in response to an event. The message filter 228 is then configured to determine if any messages were created in the previous operation, for example, while the event was at the event task enricher 226. If there was at least one message created, the flow is not interrupted and the message is saved to the event data structure 116, via the notification message collector 230, and sent off for delivery. However, if there were no messages created, the message filter 228 causes the flow to skip the operations of persisting the messages to the database and sending it to the delivery flows.

The notification message collector 230 of the controller worker 216 is configured to record any messages that may be composed and/or sent as a result of the tasks associated with the event and performed at the event task enricher 226. In particular, the notification message collector 230 is configured to record the messages in the event data structure 116 according to one or more defined data formats (in similar fashion to the event data collector 222).

The notification message output adapter 232 of the controller worker 216 is configured to transmit the various composed messages, from the event task enricher 226, to message gateways and/or queues, as appropriate. As shown in FIG. 2, for example, the controller worker 216 is coupled to a message queue manager 236, which includes a queue 238 for email messages and a queue 240 for short-message-service (SMS) messages. The message queue manager 236 may be associated with the event manager 114 and/or the payment network 106, for example, or may be a separate part of the system 100. The notification message output adaptor 232 determines to which of the queues 238, 240 to direct a message based on the message type. Specifically, the notification message output adaptor 232 directs email messages to the email queue 238 in the message queue manager 236 and SMS messages to the SMS queue 240 based on the message type. Each is connected with a communication channel, such as an email channel 242 or a SMS channel 244, for transmitting the message according to its particular type. It should be appreciated that further types of messages (e.g., voice mails, facsimiles, internal messaging systems, etc.), and respective queues and channels, may be employed in other embodiments.

Additionally, as shown in FIG. 2, a task scheduler 246 is coupled to the event data structure 116 and configured to schedule certain tasks for execution at fixed intervals. For instance, certain tasks may run every fifteen minutes, or once a day, etc. The purpose of the tasks may vary, for example, from doing housecleaning on the event data structure 116 to summarizing events in the data structure 116 from the last thirty minutes, etc. The tasks handled by the task scheduler 246 may also require messages to be sent, such that the task scheduler 246 may create and send messages pertaining to the event data to the message queue manager 236.

With that said, it should be appreciated that the tasks, executed by the task scheduler 246, are generally executed at a fixed rate (e.g., every 15 minutes, etc.) whereas the tasks executed by the event task enricher 226 are generally executed on demand in response to certain events. The scheduled tasks executed by the task scheduler 246 can include any type of task, but typical uses may involve summarizing event data for reports.

Figure 3:
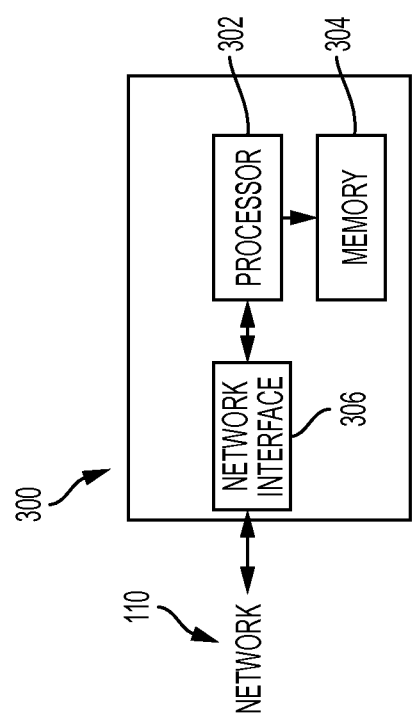
FIG. 3 is a block diagram of a computing device that may be used in the exemplary system of FIG. 1.

FIG. 3 illustrates an exemplary computing device 300 that can be used in the system 100. The computing device 300 may include, for example, one or more servers, workstations, laptops, tablets, smartphones, etc. In addition, the computing device 300 may include a single computing device, or it may include multiple computing devices located in close proximity or distributed over a geographic region, so long as the computing devices are specifically configured to function as described herein. However, the system 100 should not be considered to be limited to the computing device 300, as described below, as different computing devices and/or arrangements of computing devices may be used. In addition, different components and/or arrangements of components may be used in other computing devices.

In the exemplary embodiment of FIG. 1, each of the merchant 102, the acquirer 104, the payment network 106, and the issuer 108 are illustrated as including, or being implemented in, computing device 300, coupled to the network 110. In addition, the event coordinator 112 and/or the event manager 114 may be associated with the computing device 300 of the payment network 106, or the event coordinator 112 and/or the event manager 114 may be separate computing devices 300 in communication with the computing device 300 of the payment network. Further, the data structure 116 may be associated with the payment network computing device 300, or it may be associated with one or more of the event coordinator 112 and the event manager 114 when they are represented as separate computing devices. Again, the computing devices 300 may include a single computing device, or multiple computing devices located in close proximity or distributed over a geographic region.

Referring to FIG. 3, the exemplary computing device 300 includes a processor 302 and a memory 304 coupled to (and in communication with) the processor 302. The processor 302 may include one or more processing units (e.g., in a multi-core configuration, etc.). For example, the processor 302 may include, without limitation, a central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein.

The memory 304, as described herein, is one or more devices that permit data, instructions, etc., to be stored therein and retrieved therefrom. The memory 304 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 304 may be configured to store, without limitation, transaction data, event data, message composition data, and/or other types of data (and/or data structures) suitable for use as described herein. Furthermore, in various embodiments, computer-executable instructions may be stored in the memory 304 for execution by the processor 302 to cause the processor 302 to perform one or more of the functions described herein, such that the memory 304 is a physical, tangible, and non-transitory computer readable storage media. Such instructions often improve the efficiencies and/or performance of the processor 302 that is performing one or more of the various operations herein. It should be appreciated that the memory 304 may include a variety of different memories, each implemented in one or more of the functions or processes described herein.

In addition, the illustrated computing device 300 also includes a network interface 306 coupled to (and in communication with) the processor 302 and the memory 304. The network interface 306 may include, without limitation, a wired network adapter, a wireless network adapter, a mobile network adapter, or other device capable of communicating to one or more different networks, including the network 110. Further, in some exemplary embodiments, the computing device 300 includes the processor 302 and one or more network interfaces incorporated into or with the processor 302.

FIG. 4 illustrates an exemplary method 400 for use in processing network events asynchronously. The method 400 is described with reference to the system 100, and in particular, as operations of the particular components illustrated in FIG. 2 including, for example, the event coordinator 112 and the event manager 114. It should be appreciated, however, that the methods described herein are not limited to the system 100 as illustrated in FIGS. 1 and 2. And, conversely, the systems described herein are not limited to the exemplary method 400.

As shown in FIG. 4, at 402, the controller worker 216 of the event manager 114 initially obtains the next event, including event data, from the blocking queue 214. In turn, the event transformer 220 transforms, at 404, the obtained event data into an event object. In some embodiments, the event data obtained from the blocking queue 214 is in the format of a JSON document and/or string, an XML document, or the like. The event transformer 220 parses the event data from the obtained format into an event software object which is more easily accessed by the other modules of the controller worker 216.

The transformation of the obtained event data, by the event transformer 220, may include transformation 500 illustrated in FIG. 5. In this example, a JSON notification event 502 is shown, including a list of event parameters, as received from the blocking queue 214. The JSON notification event 502 is shown as the following exemplary JSON notification event string:

```
{
  "contactListId":"Alert Contacts",
  "messageType":"ICA-Level1-Alerts",
  "channelType":"CEM-CLEARING",
  "sendMessage":"Y",
  "parameterArray":[
```

-continued

```
    {
        "parameterId":"PRC_TRAN_ID",
        "parameterValue":"4567891234564",
        "parameterType":"String"
    },
    {
        "parameterId":"Threshold",
        "parameterValue":"1000000",
        "parameterType":"Number"
    },
    {
        "parameterId":"ThresholdExceeded",
        "parameterValue":"1005600",
        "parameterType":"Number"
    }
    ]
}
```

The event parameters of the JSON notification event 502 include a "contactListId" parameter representing the targets of a message that are generated for the event, a "messageType" parameter indicating how a message associated with the event should be sent, such as by email or by SMS, a "channelType" parameter indicating an application that is used to send the event, and a "sendMessage" parameter indicating whether message creation on behalf of the event should be initiated or suppressed. The event 502 also includes a parameter array which is populated by three additional parameters, each including a "parameterId" identifying the parameter, a "parameterValue" representing the value of the parameter, and a "parameterType" indicating a type of the parameter for use with the parameter value.

During the transformation, at 404 in method 400, data of the JSON notification event 502 in string form is parsed out of the JSON format and is populated as data object 504, including event parameter objects 506. The data object 504 is assigned a notificationEventId created by the controller worker 216 for uniquely identifying the event and a createdDateTime for tracking when the data object 504 was created. The parameters of the JSON event 502 are then used to populate the fields of the data object 504. The contactListID, messageType, and channelType remain as strings in the data object 504, but the sendMessage parameter is converted from a string to a Boolean. In some embodiments, the sendMessage Boolean is set to false if the string parameter value is "N" and set to true if the string parameter value is "Y", null, or anything else.

The data object 504 of the transformation 500 also includes a list which can be populated with event parameter objects, such as the event parameter objects 506. Each of the event parameter objects 506 is assigned a notificationEventParameterId upon creation to uniquely identify the event parameter object. Additionally, the event parameter objects 506 are populated with the notificationEventId of their parent, data object 504, as well as the string parameters from the JSON notification event 502.

Referring again to FIG. 4, in the method 400, when the event object is successfully created, at 404, the event data collector 222 records the event object to the event data structure 116, at 406. Recording the event object may include writing the data of the event object into memory associated with the event data structure 116 without alteration, for example. Alternatively, the data of the event object may be processed for storage in a different data storage scheme, such as a relational database or the like. In method 400, the event data collector 222 converts the event object into a form that is compatible with the event data structure 116 data storage scheme. Alternatively, the event data collector 222 may call an API associated with the event data structure 116, which then converts the event into an event object compatible with a defined format or scheme.

Conversion of the JSON notification event 502 to an event object compatible with a relational database is illustrated and described in FIG. 5. For example, the parameters of the fields of the event object 504 are used to populate a row 508 in the table NOTIF_EVENT of the database. The notificationEventId becomes the EVENT_ID, createdDateTime becomes the EVENT_TS, messageType becomes the MSG_TYPE_CD, contactListName becomes the CNTCT_LIST_CD, and channelType becomes the SRC_APPL_NAM. For some parameters, the conversion may include conversion from a string value into a code (integer value), such as the MSG_TYPE_CD. In some embodiments, the database may further include an additional table (not shown) which defines a relationship between messageType string values and MSG_TYPE_CD code values. This may be done in order to decrease memory space occupied by the NOTIF_EVENT table, which may have a row for each event that is processed by the event manager 114, for example. It should be appreciated that other parameters may be converted to codes as well.

In addition, each of the parameter objects 506 is converted to a row 510 on the NOTIF_EVENT_PARM table. The notificationEventParameterId becomes the EVENT_PARM_, the notificationEventId becomes the EVENT_ID, the parameterName becomes the PARM_NAM, the parameterValue becomes the PARM_VAL, and the parameterType becomes the DATA_TYPE_NAM. As described above, the parameters of the parameter objects 506 may be converted to other formats when added to the NOTIF_EVENT_PARM table and additional tables (not shown) for forming relationships between the parameters, as may be included in the database. It should be understood that the data types, parameter names, table names, and the like included in FIG. 5 are merely exemplary and not limiting.

With reference again to FIG. 4, after the event is recorded to the data structure 116, at 406, the event filter 224 determines, at 408, if the event should be filtered. The event is filtered if the controller worker 216 determines that the tasks associated with the event are unnecessary and/or have already been executed sufficiently. For example, if a consumer has reached a spending limit placed on a payment account and the payment account has already been temporarily suspended, and the consumer has already been notified of the temporary suspension, an additional payment event during the temporary suspension may be filtered. Because the account is already suspended, executing another account suspension task is unnecessary. Additionally, the consumer may have already been sufficiently notified of the account suspension. As another example, internal alerts that occur frequently but do not require urgent responses may also be filtered. If the event is filtered, at 408, the controller worker 216 skips the remaining processing and records performance data, at 418, using the performance data collector 234.

If the event is not filtered, however, the event task enricher 226 of the controller worker 216 enriches the event tasks, at 410. Specifically, the event task enricher 226 may determine tasks that are associated with the event and/or should be executed in response to the event. For example, tasks may create html content dynamically with parameters from the event, look up twenty-four hour (or other interval) transaction history for one or more customers (e.g., via a PCI compliant manner, etc.), create summary html reports to be delivered via email or otherwise, and/or retrieve previous messages from the database (e.g., data structure 116, etc.) and resubmit it for delivery, etc. The association between tasks and the event may be based on aspects of the event, such as the type of the event, etc. For instance, possible fraud events may trigger the suspension of a consumer's payment account and notification messages being sent to the consumer and/or internal parties to notify them of the potential fraud. As such, an event may trigger many tasks of varying priorities. Alternatively, an event may trigger no tasks, which in turn may cause the event to be filtered, at 408, and/or not enriched, at 410.

Task priorities may be based on response time requirements. For instance, certain tasks (critical tasks) may need to be executed within a short period of time (e.g., one second) in order for the task to be effective. Other tasks may be less urgent and require execution within a longer period of time (e.g., 15 minutes, 1 hour, etc.). In some embodiments, the event task enricher 226 executes the critical tasks immediately, at 410, while the non-critical tasks may be performed later at predefined schedules, for example, by the task scheduler 246 as described above.

Next in the method 400, at 412, the message filter 228 of the controller worker 216 determines whether any of the notifications initiated by the event task enricher 226, with respect to the tasks, should be filtered. If the event was not filtered at 408, but unnecessary notification tasks were generated at 410, the message filter 228 may filter the notifications prior to the notifications being recorded and/or transmitted. If the notification of an event is filtered, at 412, the controller worker 216 records any performance data, at 418, and completes the processing of the event. However, if a notification of the event is not filtered, by the event filter 224, at 412, the notification message collector 230 of the controller worker 216 records the event, at 414, in the event data structure 116. As described above regarding recording the event object at 406, the notification message collector 230 may convert the notification messages to a form that is compatible with the data storage scheme of the event data structure 116 prior to transmitting the notification messages.

The notification message output adaptor 232 of the controller worker 216 then sends the notification messages to the intended recipient (broadly, user), at 416, via the message queue manager 236. The notification message is then delivered, via the email channel 242 and/or the SMS channel 244, as indicated by the message type.

Once the event has been processed, the performance data collector 234 of the controller worker 216 records performance data to a performance data structure 420, at 418. The information recorded by the performance data collector 234 relates to the performance of the controller worker 216 and may be used for reporting purposes. For instance, timing data may be recorded which indicates how quickly the event was processed, how quickly certain tasks were executed in response to the event, minimum processing times, maximum processing times, average processing times, or other suitable and/or desired metrics, etc. The timing data may later be analyzed to determine if the process is efficient or if changes need to be made to meet responsiveness requirements to an event and/or task.

In view of the above, the systems and methods herein may enable payment networks and/or other payment transaction parties to process events and/or tasks associated with events in an asynchronous manner, such that time-critical tasks associated with the events are processed and/or executed within a required interval, while other less urgent tasks are processed and/or executed without interfering with the time-critical tasks. The less urgent tasks (including tasks involving creation and delivery of notification messages, etc.) are separated from the primary flow of event processing to be executed by a separate event manager.

As previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving multiple events for asynchronous processing, each of the multiple events defined by at least one rule; (b) assigning the multiple events to an event queue; (c) retrieving a first one of the multiple events from the event queue; (d) transforming the first one of the multiple events into a first event object; (e) recording the first event object to a data structure; (f) identifying at least one notification message associated with the first event object; and (g) causing the at least one notification message, associated with the first event object, to be delivered.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for asynchronous processing of certain events within a payment network, with other events being synchronously processed within the payment network, the method comprising:

receiving multiple events for asynchronous processing, apart from synchronous processing, via the payment network, each of the multiple events defined by at least one rule;

assigning, by at least one payment network computing device, the multiple events to an event queue;

retrieving, by the at least one payment network computing device, a first one of the multiple events from the event queue;

transforming, by the at least one payment network computing device, the first one of the multiple events into a first event object and at least one event parameter object associated with the first event object, the first event object including an event ID specific to the first event object and uniquely identifying the first one of the multiple events, the first event object further including at least one of: a creation date field, a contact list name field, and/or a send message field, the at least one event parameter object including the event ID specific to the first event object and a parameter ID specific to the at least one event parameter object associated with the first event object;

converting and recording, by the at least one payment network computing device, the first event object into a row of a first table of an event data structure and each of the at least one event parameter object into a row of a second table of the event data structure, wherein the row of the first table for the first event object includes the event ID specific to the first event object and the at least one of the creation date field, the contact list name field, and/or the send message field of the first event object, and wherein the row of the second table for the first event object includes the event ID specific to the first event object and the parameter ID specific to the at least one event parameter object associated with the first event object;

filtering out the first event object based on at least one task to be performed for the first event object, wherein the at least one task for the first event object includes transmission of a message related to a payment account which is redundant of a message already sent for the payment account;

in response to the first event object being filtered out, retrieving, by the at least one payment network computing device, a next one of the multiple events from the event queue;

transforming, by the at least one payment network computing device, the next one of the multiple events into a next event object and at least one event parameter object associated with the next event object, the next event object including an event ID specific to the next event object and uniquely identifying the next one of the multiple events;

converting and recording, by the at least one payment network computing device, the next event object into a row of the first table of the event data structure different than the row of the first table into which the first event object is recorded and each of the at least one event parameter object associated with the next event object into a row of the second table of the event data structure different than the row(s) of the second table into which each of the at least one event parameter object associated with the first event object is recorded, wherein the row of the first table for the next event object includes the event ID specific to the next event object and at least one of a creation date field, a contact list name field, and/or a send message field of the next event object, and wherein the row of the second table for the next event object includes the event ID specific to the next event object and a parameter ID specific to the at least one event parameter object associated with the next event object; and sending, by the at least one payment network computing device, at least one notification message, specific to the next event object, as indicated in the rows identified by the event ID for the next event object in the first and second tables of the event data structure, to an intended recipient, thereby asynchronously processing tasks(s) of the next one of the multiple events in the event queue relative to the at least one task of the first one of the multiple events.

2. The computer-implemented method of claim 1, further comprising identifying, by the at least one payment network computing device, the at least one task to be performed based on the first event object, prior to filtering out the first event object.

3. The computer-implemented method of claim 1, wherein sending the at least one notification message, specific to the next event object, includes sending the at least one notification message to the intended recipient via a message queue associated with a type of the at least one notification message.

4. The computer-implemented method of claim 3, wherein the type of the at least one notification message includes one of an email message and a short-message-service (SMS) message.

5. The computer-implemented method of claim 1, further comprising:
  accessing the next event object and the at least one event parameter object associated with the next event object in the event data structure;
  determining, by the at least one payment network computing device, at least one task to be performed based on the next event object, the at least one task including the at least one notification message; and
  scheduling the at least one task for the next event object according to an interval based on a priority of the at least one task;
  wherein sending the at least one notification message, specific to the next event object, includes sending the at least one notification message as scheduled.

6. The computer-implemented method of claim 5, wherein sending the at least one notification message as scheduled includes composing, by the at least one computing device, the at least one notification message based on the at least one task for the next event object; and
  wherein sending the at least one notification message includes sending the composed at least one notification message to the intended recipient via a message queue based on a type of the composed at least one notification message.

7. The computer-implemented method of claim 6, wherein the type of the composed at least one notification message includes one of an email message type and an SMS message type.

8. The computer-implemented method of claim 1, further comprising indicating, in the event data structure, the at least one notification message being identified for the first event object.

9. A system for asynchronous event processing within a network, the system comprising:
  at least one processor of a payment network; and
  at least one memory device in communication with the at least one processor, the at least one memory device including executable instructions, which when executed by the at least one processor, cause the at least one processor to:
    receive notification event data strings for processing asynchronously in connection with a payment account transaction, relative to synchronous processing of one or more events of the payment account transaction through the payment network;
    assign the notification event data strings to an event queue;
    for each sequential notification event data string in the event queue:
      transform the notification event data string into a notification event object and at least one event parameter object specific to the notification event object, the notification event object including an event ID specific to the notification event object and at least one of: a creation date field, a contact list name field, and/or a send message field, wherein the at least one event parameter object is specific to the notification event object and includes the event ID specific to the notification event object and a parameter ID specific to the at least one event parameter object;
      convert and record the notification event object into a row of a first data structure and each of the at least one event parameter object into a row of a second data structure, each data structure included in a shared data structure in the at least one memory device, wherein the row of the first data structure includes the event ID specific to the notification event object and the at least one of the creation date field, the contact list name field, and/or the send message field of the notification event object, and wherein the row of the second data structure includes the event ID specific to the notification event object and the parameter ID specific to the at least one event parameter object;
      determine at least one task to be performed in relation to the notification event object;
      filter the notification event object based on the at least one task for the notification event object including transmission of a message related to a payment account which is redundant of a message already sent for the payment account; and
      send a notification message, consistent with ease the at least one task for the notification event object, when the notification event object is not filtered, to an intended recipient, as indicated in the rows of the first and second data structures identified by the event ID for the notification event object, within a required time interval based on a priority associated with the at least one task, thereby asynchronously processing tasks(s) of unfiltered notification event objects relative to task(s) of filtered notification event objects.

10. The system of claim 9, wherein the executable instructions, when executed by the at least one processor, further cause the at least one processor to:
  generate the notification message based on the at least one task; and
  record the notification message to the shared data structure prior to sending the notification message.

11. The system of claim 10, wherein the notification message includes a message type, and is assigned to a message queue based at least in part on the message type.

12. The system of claim 11, wherein the message type is one of email and short-message-service (SMS).

13. The system of claim 9, wherein the shared data structure includes a relational database; and
  wherein each of the first and second data structures is compatible with the relational database.

14. The system of claim 9, wherein the at least one memory device further includes executable instructions, which when executed by the at least one processor, cause the at least one processor to:
  for each sequential notification event data string in the event queue, filter the notification event object further based on the at least one task for the notification event object being designated as non-critical;
  schedule the at least one task designated as non-critical, with at least one interval therebetween, in an execution order; and
  cause the at least one task designated as non-critical to be executed according to the execution order.

* * * * *